(12) United States Patent
Kern

(10) Patent No.: US 10,530,157 B2
(45) Date of Patent: Jan. 7, 2020

(54) COMMANDING DISTRIBUTED ENERGY RESOURCES

(71) Applicant: SunPower Corporation, San Jose, CA (US)

(72) Inventor: Gregory Kern, Pflugerville, TX (US)

(73) Assignee: SunPower Corporation, San Jose, CA (US)

( * ) Notice: Subject to any disclaimer, the term of this patent is extended or adjusted under 35 U.S.C. 154(b) by 0 days.

(21) Appl. No.: 16/539,150

(22) Filed: Aug. 13, 2019

(65) Prior Publication Data

US 2019/0372347 A1    Dec. 5, 2019

Related U.S. Application Data

(63) Continuation of application No. 16/260,411, filed on Jan. 29, 2019, now Pat. No. 10,418,815, which is a continuation of application No. 15/272,575, filed on Sep. 22, 2016, now Pat. No. 10,218,177.

(51) Int. Cl.

| | |
|---|---|
| G06F 17/50 | (2006.01) |
| H02J 3/18 | (2006.01) |
| H02J 3/28 | (2006.01) |
| H02J 3/38 | (2006.01) |
| H02J 7/00 | (2006.01) |
| H02J 3/30 | (2006.01) |
| H02J 13/00 | (2006.01) |
| H02J 3/32 | (2006.01) |

(52) U.S. Cl.
CPC .............. *H02J 3/18* (2013.01); *H02J 3/1835* (2013.01); *H02J 3/28* (2013.01); *H02J 3/30* (2013.01); *H02J 3/382* (2013.01); *H02J 7/007* (2013.01); *H02J 7/0031* (2013.01); *H02J 7/0045* (2013.01); *H02J 3/32* (2013.01); *H02J 13/0006* (2013.01); *H02J 2007/0039* (2013.01); *Y02B 90/222* (2013.01); *Y02E 40/30* (2013.01); *Y02E 60/16* (2013.01); *Y02E 70/30* (2013.01); *Y04S 20/12* (2013.01)

(58) Field of Classification Search
CPC .............................. H02J 7/0031; H02J 7/0045
USPC ........................................................ 320/111
See application file for complete search history.

(56) References Cited

U.S. PATENT DOCUMENTS

| | | | |
|---|---|---|---|
| 10,218,177 B2 | 2/2019 | Kern | |
| 2014/0015469 A1* | 1/2014 | Beaston | H02J 3/32 320/101 |
| 2014/0304025 A1* | 10/2014 | Steven | G06Q 10/06314 705/7.24 |
| 2015/0333512 A1* | 11/2015 | Saussele | H02S 10/20 700/287 |

* cited by examiner

*Primary Examiner* — Suchin Parihar
(74) *Attorney, Agent, or Firm* — Grasso PLLC

(57) ABSTRACT

Computer systems and methods regarding distributed energy resource systems (DERs) re described. Configurations and employed methods may include sending a command to a DER system to place the DER system in one or more of a charge state, a discharge state, an idle state, or a reactive power state. these DER systems may include a rechargeable battery, a dc/ac converter configured to receive a DC voltage from the battery and convert the received DC voltage for receipt by an external AC circuit, and one or more controllers configured to designate operation state of the battery in at least a charge state, a discharge state, and an idle state.

20 Claims, 7 Drawing Sheets

COMMANDING DISTRIBUTED ENERGY RESOURCES

RELATED APPLICATION

This application is a continuation of U.S. application Ser. No. 16/260,411, which was filed on Jan. 29, 2019 and is entitled Plug-In Distributed Energy Resource. The '411 application is a continuation of U.S. application Ser. No. 15/272,575, which was filed on Sep. 22, 2016, is entitled Plug-In Distributed Energy Resource, and issued on Feb. 26, 2019, as U.S. Pat. No. 10,218,177.

BACKGROUND

Most electricity using facilities are connected to a regional electrical grid maintained and powered by an electric utility and draw alternating current (AC) power from that regional electrical grid. Increasing numbers of facilities are supplementing or replacing the AC power drawn from the regional electrical grid with distributed power generated on-site by renewable energy sources such as solar or wind that do not generate power at a constant rate throughout the day. Additionally, because load demand on the regional electric grid can vary with respect to time of day, date, or weather conditions but electrical generation must always meet load demand, electrical utilities must maintain the ability to ramp up power generation to meet load demand and avoid brownouts. Further, the increase of distributed energy resources on the grid can have a negative impact to grid stability of voltage and/or frequency. Further, in order to discourage users from drawing more power during periods of high load demand, electric utilities may increase prices on electricity during high load demand periods and decrease prices during low load demand periods. In order to make use of energy generated during one time of day in a second time of day, meet load demand with additional power, arbitrage energy across different rate periods, or improve grid stability as well as other reasons, interest in on-site energy storage with grid support capability is increasing.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

SUMMARY

Figure 1:
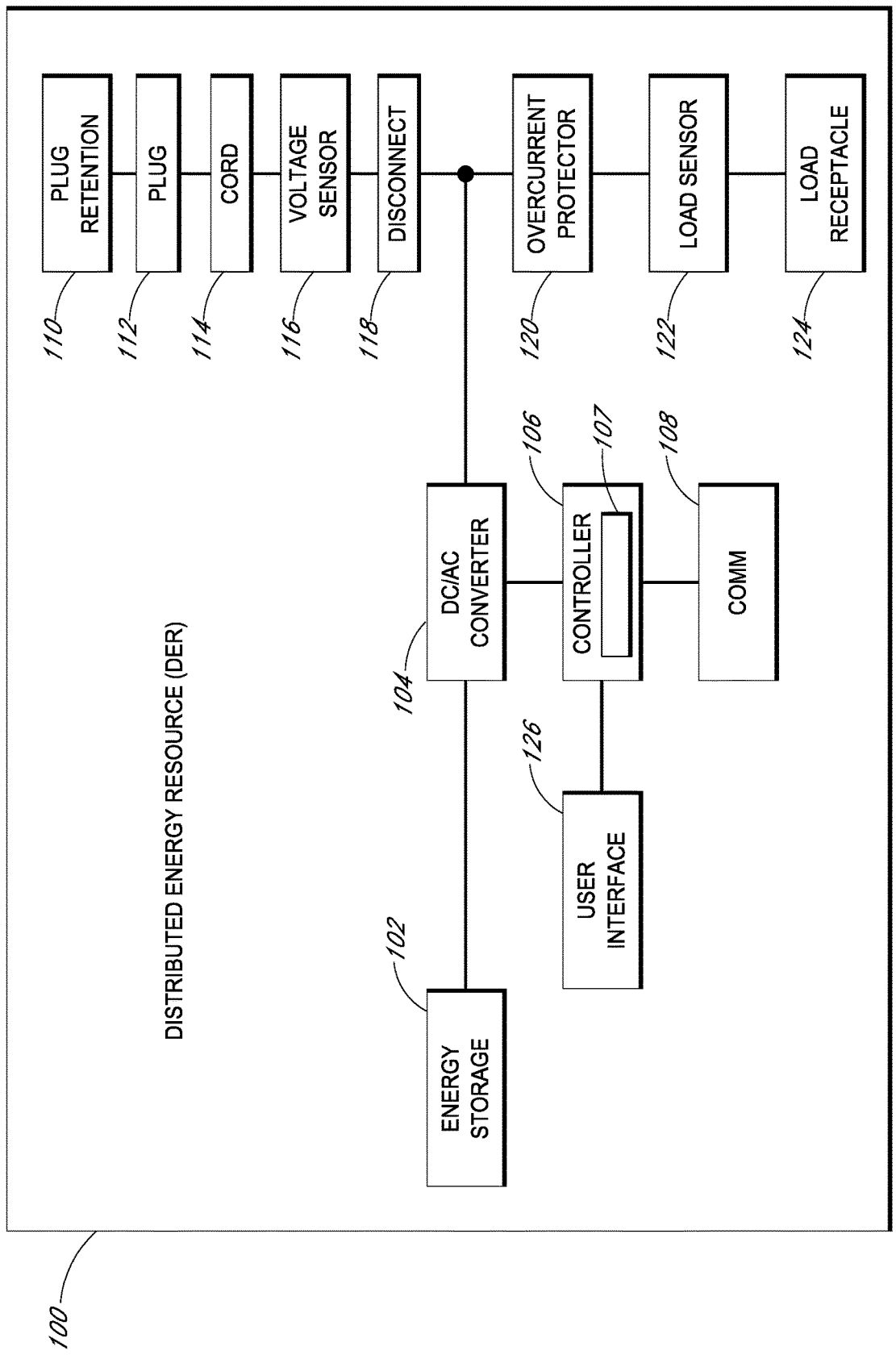
FIG. 1 shows a block diagram of the components of a distributed energy resource (DER) in accordance with various disclosed embodiments.

Embodiments may include a distributed energy resource (DER) comprising: a plug configured to couple to an AC circuit and receive or deliver AC power from or to the AC circuit; a receptacle configured to receive a plug of a load device and transmit AC power to the load device; an energy storage circuit; one or more controllers; a program memory storing executable instructions that when executed by the one or more controllers cause the DER to: determine whether to set the DER to a charge state or a discharge state, determine an amperage difference between a first threshold value and the amperage of an AC power transmitted to the load device, if the amperage difference is above a charge threshold value and the DER is set to a charge state, charge the energy storage circuit with AC power received from the AC circuit, and if the DER is set to a discharge state, deliver AC power to the AC circuit by discharging the energy storage circuit.

Embodiments may also include a method for operating a distributed energy resource (DER) having a plug, a receptacle, and an energy storage circuit, the method comprising: receiving AC power from an AC circuit via the plug of the DER; transmitting AC power to a load device coupled to the DER via the receptacle of the DER; determining whether to set the DER to a charge state or a discharge state; determining an amperage difference between a first threshold value and the amperage of the AC power transmitted to the load device; if the amperage difference is above a charge threshold value and the DER is set to a charge state, charging the energy storage circuit with AC power received from the AC circuit; and if the DER is set to a discharge state, delivering AC power to the AC circuit by discharging the energy storage circuit.

Embodiments may further include a distributed energy resource (DER) comprising: a plug configured to couple to an AC circuit and receive AC power from the AC circuit; a receptacle configured to receive a connector to a load device and transmit AC power to the load device; a bidirectional DC/AC converter; one or more controllers; a program memory storing executable instructions that when executed by the one or more controllers cause the DER to: determine whether to set the DER to a reactive power source state; and if the DER is set to a reactive power source state, use the DC/AC converter to source or sink reactive power to the AC circuit.

DETAILED DESCRIPTION

The following detailed description is merely illustrative in nature and is not intended to limit the embodiments of the subject matter of the application or uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. § 112, sixth paragraph, for that unit/component.

"First," "Second," etc. As used herein, these terms are used as labels for nouns that they precede, and do not imply any type of ordering (e.g., spatial, temporal, logical, etc.). For example, reference to a "first" plug does not necessarily imply that this plug is the first plug in a sequence; instead the term "first" is used to differentiate this plug from another plug (e.g., a "second" plug).

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

In the following description, numerous specific details are set forth, such as specific operations, in order to provide a thorough understanding of embodiments of the present disclosure. It will be apparent to one skilled in the art that embodiments of the present disclosure may be practiced without these specific details. In other instances, well-known techniques are not described in detail in order to not unnecessarily obscure embodiments of the present disclosure.

Referring now to FIG. 1, a block diagram showing various components of a distributed energy resource (DER) 100 is shown. The DER 100 may include energy storage 102, a DC/AC converter 104, a controller 106, a program memory 107, a communications module 108, plug retention device 110, a plug 112, a cord 114, a voltage sensor 116, a disconnect 118, an overcurrent protector 120, a load sensor 122, a load receptacle 124, and a user interface 126. While only one of each component of the DER 100 is shown in FIG. 1, it will be understood that the DER 100 may include more than one of any or all of the shown components (e.g., more than one controller 106, more than one communications module 108, more than one DC/AC converter 104, more than one energy storage 102, etc.). Further, it will be understood that the DER 100 may not include all of the components shown in FIG. 1. For example, the DER 100 may not include energy storage 102 or a user interface 126.

Energy storage 102 may be an array of one or more rechargeable batteries (e.g., Li ion batteries) and necessary components to receive a DC voltage from the DC/AC converter 104 and charge the one or more rechargeable batteries if the DER 100 is in a charge stage or deliver DC voltage to the DC/AC converter 104 if the DER 100 is in a discharge stage or to store energy if the DER 100 is in an idle state. Alternatively or additionally, energy storage 102 may include other energy storage devices such as capacitors, inductors, or other devices to store and deliver electrical energy. Alternatively or additionally, energy storage 102 may include other forms of energy storage such as a flywheel or compressed air coupled with suitable circuits for conversion to or from DC electrical power. Energy storage 102 may be sized to store any of a number of different amounts of power (e.g., 1 kilowatt hour, 10 kilowatt hours, 100 kilowatt hours, etc.). As discussed herein, the DER 100 may use energy storage 102 for time of use arbitrage, duck curve mitigation, energy delivery when the utility needs to deliver more power to the grid storage of solar-generated power for use during times in which less solar power can be generated, uninterruptable power supply (UPS) functionality, etc.

As used herein, the term "time of use arbitrage" refers to using the DER 100 to store energy during a first period of time when AC power (e.g., from the utility grid) is priced at a first amount of money and discharging the stored energy during a second period of time when AC power is priced at a second amount of money, wherein the second amount of money is greater than the first amount of money. Additionally, as used herein, the term "duck curve" refers to the circumstance where distributed renewable power generation (e.g., distributed solar power generation) occurs at midday but utility peak loads occur later in the day, so the time of use load curves seen by utilities dip in the middle of the day for their load profiles. Accordingly, it may be advantageous for a utility to mitigate the duck curve by having distributed energy storage (e.g., the energy storage 102 of the DER 100) charge during the middle of the day and discharge later in the day to help level utility load curves.

The DC/AC converter 104 may be a bidirectional DC/AC inverter or any other device that is configured to convert AC power to DC power in one direction (e.g., when charging energy storage 102) and convert DC power to AC power in the other direction (e.g., when discharging energy storage 102). Collectively the DC/AC converter 104 and energy storage 102 may also be referred to herein as an "energy storage circuit." The DC/AC converter 104 may be the interface between energy storage 102 and the AC circuit to which the DER 100 is coupled (e.g., an AC branch circuit 212 discussed herein). When energy storage 102 is connected, the DC/AC converter 104 may charge or discharge the battery based upon a signal from the controller 106 to source or sink real power to the AC circuit. With or without energy storage 102, the DC/AC converter 104 may also be capable of providing reactive power to the AC circuit in support of e.g., CA Rule 21, Hawaii Electric Rule 14, UL 1741 SA or pending changes to IEEE 1547 requirements. As discussed herein, reactive power functions may provide voltage and or and/or frequency grid support functions and other supportive functions desired by electric utilities. The DC/AC converter 104 may provide information to the controller 106 about its status including operating real power, reactive power, voltage and/or current on the AC circuit side, and/or voltage and/or current on the energy storage 102 side of the DC/AC converter DC/AC.

The controller 106 may include one or more computer processors capable of executing instructions causing the DER 100 to implement the actions specified by the instructions. The controller 106 may include a program memory 107. The program memory 107 may be configured to store computer-readable instructions that when executed by the controller 106 cause the DER 100 to implement the methods described herein. The controller 106 may also include a random access memory (RAM) (not pictured), an input/output (I/O) circuit (not pictured). The various components of the controller 106 may be interconnected via an address/data bus (not pictured).

Figure 2:
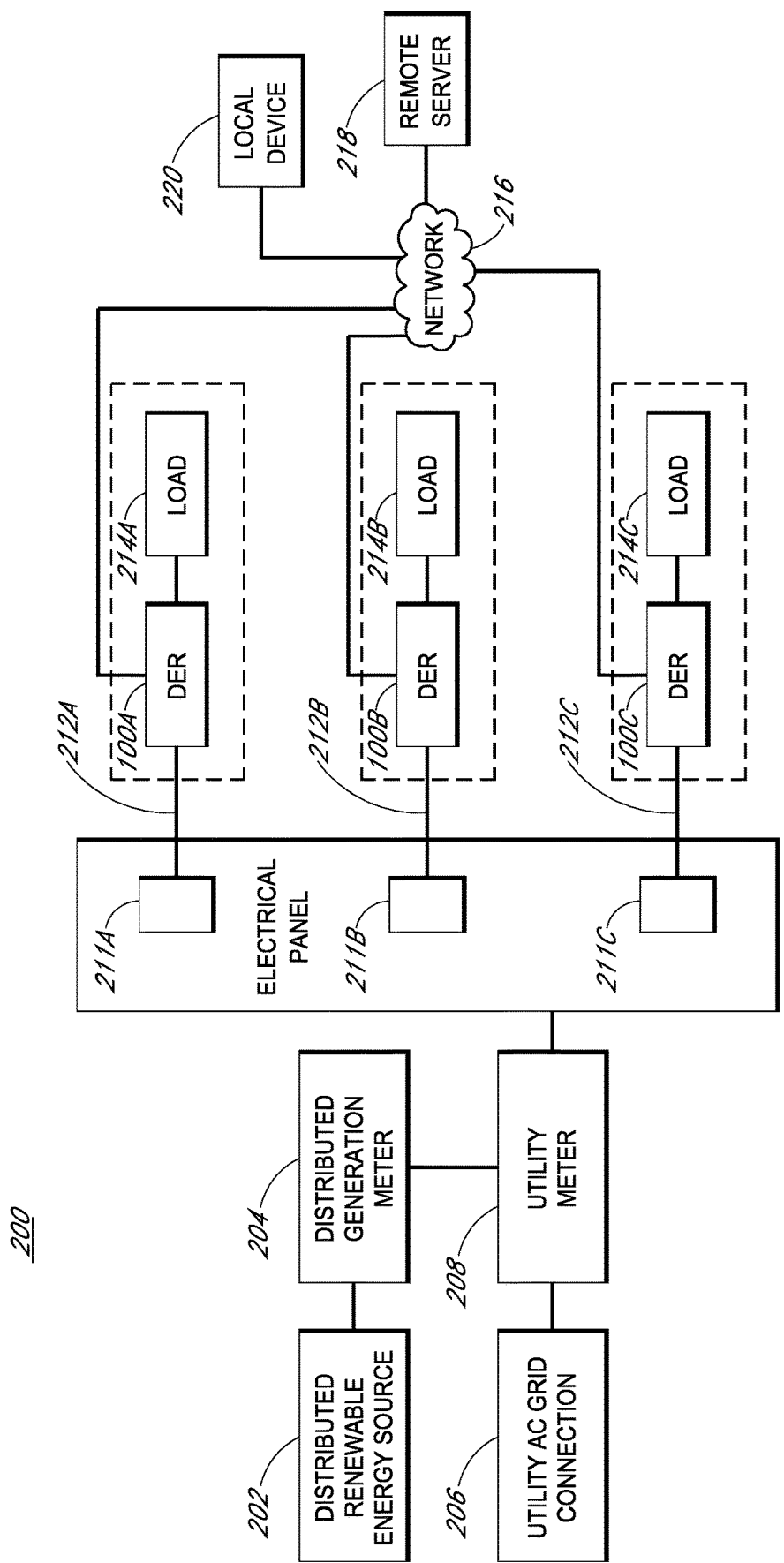
FIG. 2 shows a block diagram of the components of a system including one or more DERs in accordance with various disclosed embodiments.

The communications module 108 may include any of a number of wired (e.g., USB, Ethernet) or wireless (e.g., 802.11 WiFi, Zigbee radio) communications connections. The communications module 108 may be configured to transmit and/or receive communications from some or all of a customer user, (e.g., the owner of the home in which the DER 100 is installed communicating with the DER 100 with a local device 220 as shown in FIG. 2), a utility user (e.g., a technician monitoring the status of the grid), or a program running on a remote server (e.g., a remote server 218 as shown in FIG. 2). As discussed herein, the communications module 108 may receive commands to put the DER 100 in a charge state, a discharge state, an idle state, or a reactive power state. Alternatively or additionally, the communications module 108 may receive information (e.g., weather forecast information, chronological information) that the DER 100 (via the controller 106) may use to determine whether to put itself into a charge state, a discharge state, an idle state, or a reactive power state. Additionally, the communications module 108 may be used at the manufacturing site at which the DER 100 is built to preconfigure a unit for a schedule of operation of the DER 100, may be used to determine time of day and date, may be used to provide firmware or software updates to the DER 100, etc.

The plug 112 may be any of a number of known plugs used to couple to a receptacle coupled to a preexisting AC circuit. For example, the plug 112 may be a plug configured to be inserted into an electrical receptacle in a wall. Depending on the local standard, the plug 112 may have a plurality of prongs (e.g., 3 prongs, 4 prongs, etc.). In some embodiments, the plug 112 is a National Electric Manufacturers Association (NEMA) 10-30 electrical clothes dryer plug. In other embodiments, the plug 112 is a NEMA 14-30 electric clothes dryer plug. The plug 112 may also be a plug of the type used to power an electric dryer, an electric range and oven, an electric water heater, a refrigerator, or other specialized plug or a standard AC plug in the country in which the DER 100 will be installed. The plug 112 may be configured to receive or deliver AC power from or to the AC circuit to which it is coupled.

Because it may be required (e.g., by local electrical code) that the plug 112 not be inadvertently removed by a casual user in some embodiments, the DER 100 may include a plug retention device 110. Such a plug retention device 110 may, for example, make the DER 100 more likely to be listed by UL or other safety organizations. The plug retention device 110 may be a mechanical securement that requires a tool to operate (e.g., key) such as a special cover plate for the receptacle to which the DER 100 is coupled. The special cover plate may mechanically couple to the plug 112 such that the plug 112 may only be decoupled from the receptacle after using the key (or other tool) to unlock the retention mechanism. The plug 112 may also include a lamp indicating that voltage is present as a convenience to a user so that they know when voltage is present.

The cord 114 may be a standard insulated power cord of any of a number of lengths (e.g., 6 feet, 12 feet, 100 feet, etc.). For example, the cord 114 may be 6 feet long, which will enable the DER 100 to be mounted to the wall near the receptacle to which the plug 112 is coupled (e.g., mounted on the wall in the laundry room if the DER 100 is coupled to an electric dryer receptacle). Alternatively, the cord 114 may be short enough such that the entire DER 100 may mount to the receptacle of the AC circuit. A longer cord 114 may enable the DER 100 to be located at a distance from the receptacle of the AC circuit (e.g., if the receptacle is a dryer receptacle in a laundry room, most of the DER 100 may be located in the garage with only the cord 114 and plug 112 disposed in the laundry room.

The DER 100 may include a voltage sensor 116 located on the AC circuit side of the disconnect 118. The voltage sensor 116 may be used to measure grid voltage and/or grid frequency, and communicate such measurements to the controller 106. Grid voltage and grid frequency sensing may be used to determine when grid support functions of the DER 100 may be needed. The voltage sensor 116 may also be used to allow for synchronization between the DC/AC converter 104 and the grid prior to re-closing the disconnect 118.

The DER 100 may include a disconnect 118. The disconnect 118 may be an AC contactor (or other controllable switch) that disconnects the AC circuit allowing the remainder of the DER 100 to provide power and energy from the energy storage 102 to the load receptacle 124 when operating in an uninterruptible power supply (UPS) mode of operation. The disconnect 118 may disconnect the AC circuit from the remainder of the DER 100 based on a command from the controller 106 and may connect the AC circuit to the remainder of the DER 100 based on a command from the controller 106.

The DER 100 may include an overcurrent protector 120. The overcurrent protector 120 may be any of a number of known devices (e.g., a circuit breaker, a fuse, a combination of the two, etc.) configured to disconnect the load device from AC power if the amperage of the AC power transmitted to the load device through the DER 100 is greater than or equal to a threshold value. Such a threshold value may be the maximum rated current of the AC circuit. For example, as discussed herein in connection to FIG. 2, if the AC circuit is a dedicated branch circuit 212 for an electric dryer, the maximum rated current may be 30 amps. In such an example, the overcurrent protector 120 may be a 30 amp circuit breaker that will open the circuit automatically if more than 30 amps flows through the 30 amp circuit breaker.

Alternatively, overcurrent protection may be provided to the load receptacle through proper operation of the controller 106 using the signals from the load sensor 122 and reliance upon the facility over current protection already provided to the AC circuit (e.g., the overcurrent protection devices 211 discussed herein in connection to FIG. 2).

The load sensor 122 may include any of a number of known devices capable of determining how much load current is being drawn by a load device 214 coupled to the load receptacle 124 (e.g., an electrical dryer). For example, the load sensor 122 may be a current transformer connected to two lines coupled to the load receptacle (e.g., a line one and a line two). The load sensor 122 may also include a voltage sensor to determine the voltage of the load receptacle 118 to determine a load voltage measurement. The load current measurement and load voltage measurement may be used (e.g., by the controller 106 or a controller included in the load sensor 122) to determine the real and reactive power drawn by the load device 214 as well as total rms current drawn by the load device 214. The load sensor 122 may output any or all of the measurements it makes to the controller 106. Alternatively, the controller 106 may use the voltage and or current signals of the load sensor 122 to determine power and other parameters drawn by the load device 214.

The load receptacle 124 may be a receptacle configured to receive a plug of a load device 214 and transmit AC power to the load device 214. The load receptacle 124 may be a receptacle of the same type as the receptacle of the AC circuit to which the plug 112 is coupled. For example, if the receptacle of the AC circuit is a NEMA 14-30 receptacle and the plug 112 is a NEMA 14-30 plug, the load receptacle 124 may be a NEMA 14-30 receptacle. Alternatively, the load receptacle 124 may be a different type of receptacle from the receptacle of the AC circuit (e.g., if the receptacle of the AC circuit is a NEMA 10-30 receptacle, the load receptacle 124 may be a NEMA 14-30 receptacle) if such a difference is permitted by local electrical code.

The DER 100 may also include one or more user interfaces 120. The one or more user interfaces 120 may include output devices such as an LCD display, an OLED display, or an array of lights (e.g., LEDs) to display information visually. The one or more user interfaces 120 may also include input devices such as a keyboard, one or more buttons, one or more switches, one or more dials, and/or a touchscreen display (e.g., an LCD touchscreen) to receive local user input. The user interface 126 may also include a graphical user interface displayed over a network (e.g., a network 216) to receive input and display output to a user accessing the DER 100 via the network. Additionally or alternatively, the user interface 126 may include an application program interface (API) configured to receive commands from and display information to an application monitoring the energy use (and in some embodiments the distributed renewable power generation) of the facility at which the DER 100 is installed. Such an application may include the SunPower® Residential Monitoring System, for example.

Referring now to FIG. 2, a block diagram of a system 200 including one or more DERs 100 is shown. The system 200 may include a distributed renewable energy source 202, a distributed generation meter 204, a utility AC grid connection 206, a utility meter 208, an electric panel 210, one or more AC branch circuits 212, a network 216, a remote server 218, and a local device 220. The majority of the components of the system 200 (i.e., all but the network 216 and remove server 218) may be located at the same facility (e.g., a house, commercial installation, etc.). It will be understood that while FIG. 2 shows one of each of the distributed renewable energy source 202, distributed generation meter 204, utility AC grid connection 206, utility meter 208, electric panel 210, network 216, remote server 218, and local device 220, the system 200 may include one or more of each in various embodiments or may not include all of the components shown (e.g., a system 200 may not include a distributed renewable energy source 202 or a distributed generation meter 204).

The distributed renewable energy source 202 may be one or more renewable energy sources of AC power (e.g., a solar photovoltaic (PV) array, a solar thermal array, a wind turbine, a biofuel generator, etc.). It will be understood that the distributed renewable energy source 202 may not generate AC power at a consistent rate throughout the course of a day (e.g., a PV array may generate more AC power during midday than during the morning or evening). The distributed generation meter 204 may be coupled to the distributed renewable energy source 202 and utility meter 208 and may track the amount of AC power generated by the distributed renewable energy source 202 and fed into the AC circuit of the system 200.

The utility AC grid connection 206 may be coupled to the AC grid and to the utility meter 208. The utility AC grid connection 206 may be configured to draw AC power from the AC grid, and to also deliver power (e.g., AC power generated by the distributed renewable energy source 202, AC power discharged from a DER 100) to the AC grid. The AC grid may be coupled to a regional electric grid operated by an electric utility.

The utility meter 208 may be coupled to the distributed generation meter 204, utility AC grid connection 206, and the electric panel 210. As will be understood, the utility meter 208 may measure the amount of AC power drawn from the AC grid via the utility AC grid connection 206, and in some embodiments may subtract the amount of power generated by the distributed renewable energy source 202 that is delivered to the AC grid. The utility meter 208 may deliver AC power (i.e., from the AC grid and/or from the distributed renewable energy source 202) to the electric panel 210 and may deliver AC power discharged from the one or more DERs 100 to the AC grid. The utility meter 208 may also track the amount of AC power delivered to the AC grid that has been discharged by the one or more DERs 100.

The electric panel 210 may be coupled to the utility meter 208 and the one or more AC branch circuits 212. The electric panel 210 may deliver AC power from the AC grid to the AC branch circuits 212 and may also deliver AC power discharged by the one or more DERs 100 to the AC grid via the utility meter 208. The electric panel 210 may include one or more overcurrent protection devices 211 (e.g., circuit breakers, fuses, a combination of both, etc.). The electric panel 210 may be coupled to the one or more AC branch circuits 212 via the overcurrent protection devices 211 (e.g., an overcurrent protection device 211A may be coupled to a first AC branch circuit 212A). As discussed herein, each AC branch circuit 212 may be designed to conduct an AC current (at the voltage and frequency specified by local electrical grid specifications) below a maximum rated current (e.g., 50, amps, 30 amps, 20 amps, 10 amps).

In embodiments, the electric panel 210 and/or overcurrent protection device 211 may communicate with the DER 100 (e.g., over a network 216) and receive information regarding the amount of current flowing into the DER 100 via the plug 112 and out of the DER 100 via the load receptacle 124. In such a case, the electric panel 210 and/or overcurrent protection device 211 may coordinate with the DER 100 to ensure that the current flowing through the AC branch circuit 212 does not exceed the maximum rated current. For example, if the maximum rated current of the first AC branch circuit 212A is 30 amps and the DER 100 is discharging its energy storage 102 to deliver 5 amps to the load device 214A and communicates information regarding this 5 amp delivery to the electric panel 210 and/or overcurrent protection device 211, the electric panel 210 and/or overcurrent protection device 211 may ensure that no more than 25 amps is delivered from the AC grid to the AC branch circuit 212A. In some embodiments, electric panel 210 and/or overcurrent protection device 211 have no way of knowing what is coupled to each AC branch circuit 212, including whether a DER 100 is installed. In such embodiments, the overcurrent protection device 211 will only disconnect AC power from the AC branch circuit 212 if the maximum rated current is exceeded (e.g., 40 amps is flowing to an AC branch circuit 212 with a 30 amp maximum rated current).

The one or more AC branch circuits 212 are AC circuits connecting one or more loads 214 to AC power (at the voltage and frequency specified by local electrical grid specifications) and may be coupled to the electric panel 210 via AC power cables sufficient to carry that AC power. In FIG. 2, three AC branch circuits 212A, 212B, and 212C are shown, although fewer or more branch circuits may be present in the system 200. Each AC branch circuit 212 may include a DER 100 and a load device 214. Each AC branch circuit 212 may be a dedicated branch circuit for a single load device 214. For example, the first AC branch circuit 212A may be a dedicated branch circuit for a load 212A that is an electric dryer, the second AC branch circuit 212B may be a dedicated branch circuit for a load 212B that is an electric range, and the third AC branch circuit 212B may be a dedicated branch circuit for a load 212C that is an electric water heater. Of course, it will be understood that each branch circuit 212 may include more than one load 214. Each AC branch circuit 212 may have a maximum rated current (e.g., 50, amps, 30 amps, 20 amps, 10 amps, etc.) and AC wiring sufficient to carry the maximum rated current. As discussed herein, if a current higher than the maximum rated current flows from the electric panel 210 to the AC branch circuit 212, the overcurrent protection device 211 coupled to the AC branch circuit 212 may disconnect (e.g., by a circuit breaker tripping, a fuse opening) AC power from the AC branch circuit 212 to which it is coupled.

The network 216 may be any of a number of wired (e.g., USB, Ethernet) and/or wireless (e.g., 802.11 WiFi, Zigbee) communication networks coupled to various devices in the system 200. In some embodiments, the network 216 includes the Internet. While the network 216 is shown coupled to the DERs 100, remote server 218, and local device 220, in some or all of the other components in the system 200 may be communicatively coupled to the network 216.

The remote server 218 may be one or more computing devices located in a separate geographic location than the rest of the system 200 and communicatively coupled to the DER 100 via the network 216. As discussed herein, the remote server 218 may be used to operate an interface (e.g., a GUI, an API, etc.) receiving information from and sending information to the one or more DERs 100 (e.g., to display data gathered by a DER 100, to put the DER 100 in one or more of a charge state, discharge state, idle state, or reactive power state). The remote server 218 may also receive a command (e.g., from a local user, a remote utility technician, or other software) to put a DER 100 in one or more of a charge state, discharge state, idle state, or reactive power state and relay such a command to the appropriate DER 100 over the network 216.

The local device 220 may be any of a number of devices configured to communicate with a DER 100 over the network 216. For example, the local device 220 may be a computer communicatively coupled to a home WiFi network 216 to which the one or more DERs 100 are communicatively coupled. A local device 220 may be one or more of a laptop, tablet computer, smartphone, wearable computer, etc.

Referring now to FIGS. 3A-3D, a flowchart illustrating a DER operating method 300 is shown. The DER operating method 300 may be implemented all or in part by the DER 100. Additionally, the DER operating method 300 may be partially implemented using the remote server 218 and/or local device 220. At block 302, the DER 100 receives AC power from the AC circuit (e.g., via the plug 112 coupled to the receptacle of the AC circuit). At block 302, the DER 100 transmits AC power to the load device 214 as discussed herein (e.g., via the load receptacle 124 coupled to a plug of the load device 214).

At block 306, the DER 100 determines (e.g., with the load sensor 122 and/or controller 106) the amperage difference between the amperage of the maximum rated current of the AC circuit and the amperage of the AC power transmitted to the load device 214. This amperage difference may be based upon rms measurements of each current individually or the rms of the difference of the currents. The DER 100 may receive a value for the maximum rated current from a user (e.g., an installer who checks the maximum rated current of the AC branch circuit 212 to which the DER 100 is installed and inputs it to the DER 100 via the user interface 126 and/or via the communications module 108), from a remote server 218, and/or a local device 220. Alternatively, the DER 100 may be preprogrammed with the maximum rated current of the AC circuit. Accordingly, an installer may have to select the appropriate DER 100 for the AC circuit. The maximum rated current may depend on the type of plug 112 and load receptacle 124. For example, if the plug 112 and load receptacle 124 are NEMA 10-30 or NEMA 14-30 type plugs and receptacles, respectively, the maximum rated current is 30 amps. The DER 100 may determine the amperage of the AC power transmitted to the load device 214 using the load sensor 122. The DER 100 may store the amperage difference in memory (e.g., RAM of the controller 106).

At block 308, a determination is made whether to put the DER 100 in a charge state, a discharge state, or idle state. This determination may be made by the DER 100 and/or may be made by a remote server 218, local device 220, and/or a user. The determination of whether to put the DER 100 in a charge state, a discharge state, or idle state may be based in part on a measurement made by the DER 100 of the difference between the maximum capacity of energy storage 102 and the amount of energy currently stored in energy storage 102 (also referred to herein as the charge level of energy storage 102). If energy storage 102 is empty, it may be advantageous to charge energy storage 102. If energy storage 102 is not fully charged, it may be advantageous to discharge or charge energy storage 102. If energy storage 102 is fully charged, it may be advantageous to discharge energy storage 102. Charging or discharging energy storage 102 may not be merely an on/off function but may have variable amounts of charging or discharging power levels as determined by the controller 106 or network 216. As discussed herein, the DER 100 may be used for time of use arbitrage, duck curve mitigation, energy delivery when the utility needs to deliver more power to the grid, storing energy generated by a distributed renewable energy source 202 for use when the distributed renewable energy source 202 is generating less energy, sourcing or sinking reactive power for grid support, or for UPS functionality (collectively "DER use cases"). Accordingly, the determination is made whether to put the DER 100 in a charge state, a discharge state, a reactive power state, or idle state depending on the charge level of energy storage 102 and the DER use cases.

If the DER 100 is performing time of use arbitrage, the DER 100 may receive (e.g., via the communications module 108, via the user interface 126) information relating to the price the utility providing power to the system 200 is charging during different time periods (e.g., a first time period, a second time period). For example, the utility may charge $0.11 per kilowatt hour during a first time period between noon and 4:00 PM and charge $0.15 per kilowatt hour during a second time period between 4:00 PM and 8:00 PM. In such a case, the DER 100 may store energy during the first time period and provide energy during the second time period. Accordingly, if the DER 100 is performing time of use arbitrage, energy storage is not fully charged, and the time is between noon and 4:00 PM, the DER 100 may be put in a charge state. Further, if the DER 100 is performing time of use arbitrage, energy storage is not empty, and the time is between 4:00 PM and 8:00 PM, the DER may be put in a discharge state.

Similarly, if the DER 100 is performing duck curve mitigation, whether the DER 100 is put in a charge state, a discharge state, or an idle state may be based on the amount of energy currently stored in energy storage 102, the time of day, and configurations from the local utility or operator. As discussed above, to mitigate the duck curve, the DER 100 may store energy at midday and discharge stored energy in the evening when less energy is being generated by PV arrays. The utility may determine (based on generating capacity, current and past loads, the weather forecast, etc.) when it requires (or anticipates it will require) additional energy to be delivered to the AC grid from one or more DERs 100 in the utility's service area. If the utility requires (or anticipates it will require) additional energy to be delivered to the grid, the utility may determine (e.g., via the communications module 108 and network 216) the amount of energy currently stored in energy storage 102 in the DER 100 and command the DER 100 to enter a discharge state or alternatively command the DER 100 to not enter a charge state (thus adding more load to the AC grid). In order to have one or more DERs 100 with energy stored in energy storage 102 available for discharge, the utility may command the DERs 100 to enter a charge state during a period of time when the utility does not require additional energy to be delivered to the grid (e.g., during midday when PV arrays are delivering AC power to the AC grid).

Additionally or alternatively, the DER 100 may be communicatively coupled to the distributed renewable energy source 102 (e.g., via the network 216) and may receive a measurement or estimate of how much AC power the distributed renewable energy source 102 is generating. If the distributed renewable energy source 102 is generating AC power above a threshold level (e.g., 10% of the maximum power output of the distributed renewable energy source 102, 20% of the maximum power output of the distributed renewable energy source 102, etc.) and energy storage 102 is not fully charged, the DER 100 may enter a charge state. If the distributed renewable energy source 102 is not generating AC power above the threshold level and energy storage 102 is not empty, the DER 100 may enter a discharge state.

Additionally or alternatively, the DER 100 may be used for UPS functions. The DER 100 may determine that it is receiving AC power from the AC circuit and transmitting AC power to the load device 214 during a first time period and then detect that the DER 100 has stopped receiving AC power from the AC circuit during a second time period. In order to allow continuous operation of the load device 214, if energy storage 102 is not empty, the DER 100 may enter a discharge state and open the disconnect 118 so that power generated by the DC/AC converter 104 does not back feed into the AC circuit. When the AC circuit has been restored to nominal operation as sensed through voltage sensing 111, the controller 106 may synchronize operation of the DC/AC converter 104 to the AC circuit and then re-close the disconnect 118. If the DER 100 is providing UPS functionality, it may be advantageous for the DER 100 to enter a charge state whenever energy storage 102 is not fully charged (and the DER 100 has not received a command to not enter a charge state).

Figure 3A:
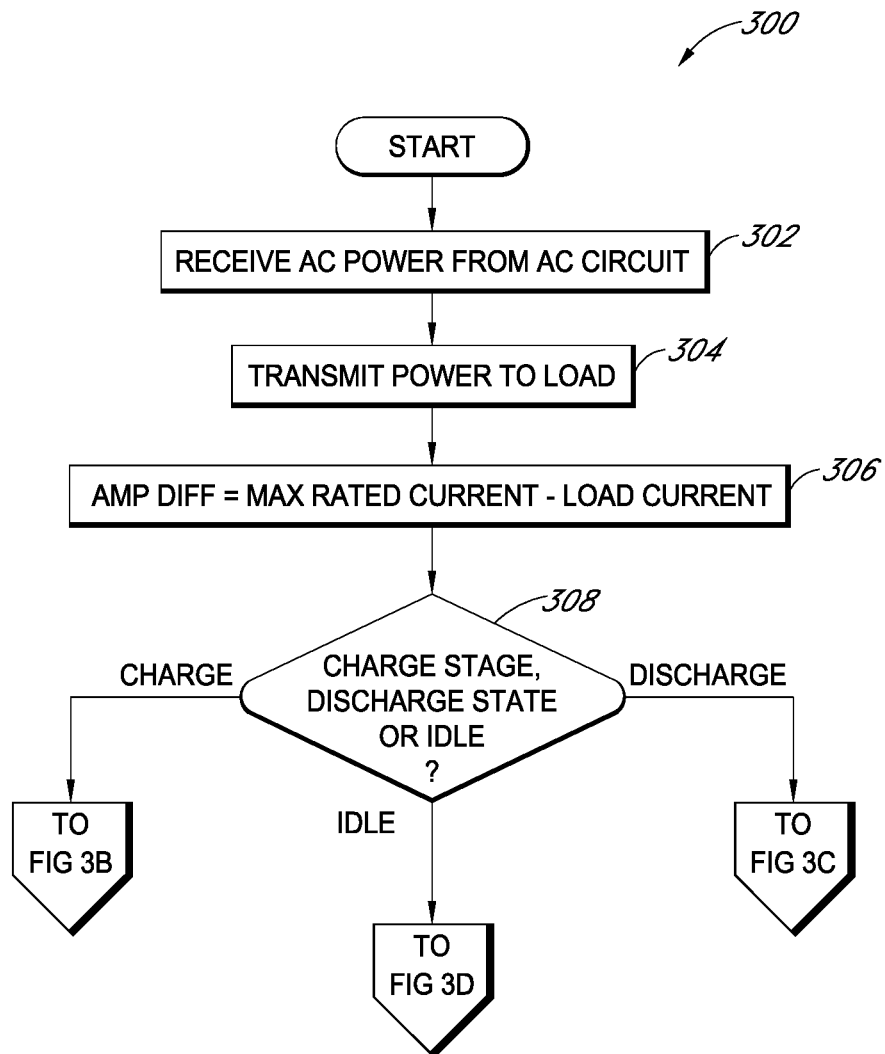
FIG. 3A-D is a flow chart illustrating an example DER operation method in accordance with various disclosed embodiments.
Figure 3B:
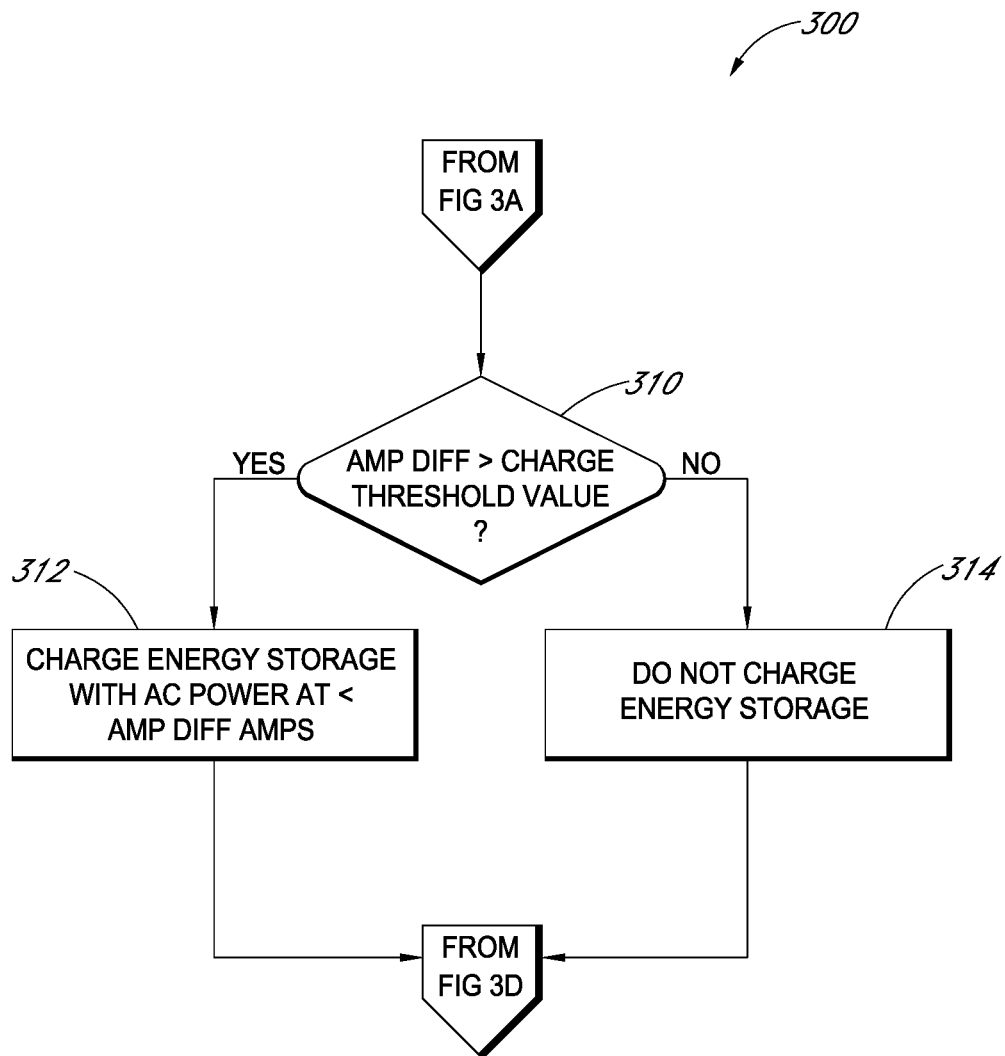

If the DER 100 is set to a charge state, the method 300 continues on FIG. 3B. If the DER 100 is set to a discharge state, the method 300 continues on FIG. 3C. If the DER 100 is set to an idle state, the method 300 continues on FIG. 3D.

Referring now to FIG. 3B, a flowchart illustrating the actions performed by a DER 100 in a charge state is shown. At block 310, the DER 100 determines whether the amperage difference (i.e., the maximum rated current–amperage of AC power transmitted to the load device 214) is less than a charge threshold value. The charge threshold value may be the minimum current required to charge energy storage 102. Alternatively, the charge threshold value may be as low as 0 amps. If the amperage difference is less than the charge threshold value, the DER 100 may charge energy storage 102 at block 312. In order to prevent the overcurrent protector 211 of the electric panel 210 from disconnecting power to the AC circuit, it is important that the DER 100 not draw more current than the amperage difference to charge energy storage 102 and may adjust the level of charge current to prevent exceeding the amperage difference. Accordingly, the DER 100 may only draw an amperage less than the amperage difference. If the amperage difference is greater than the charge threshold value, then the DER 100 does not charge energy storage 102 at block 314. After block 312 or 314, the method 300 may continue on to FIG. 3D discussed herein.

Figure 3C:
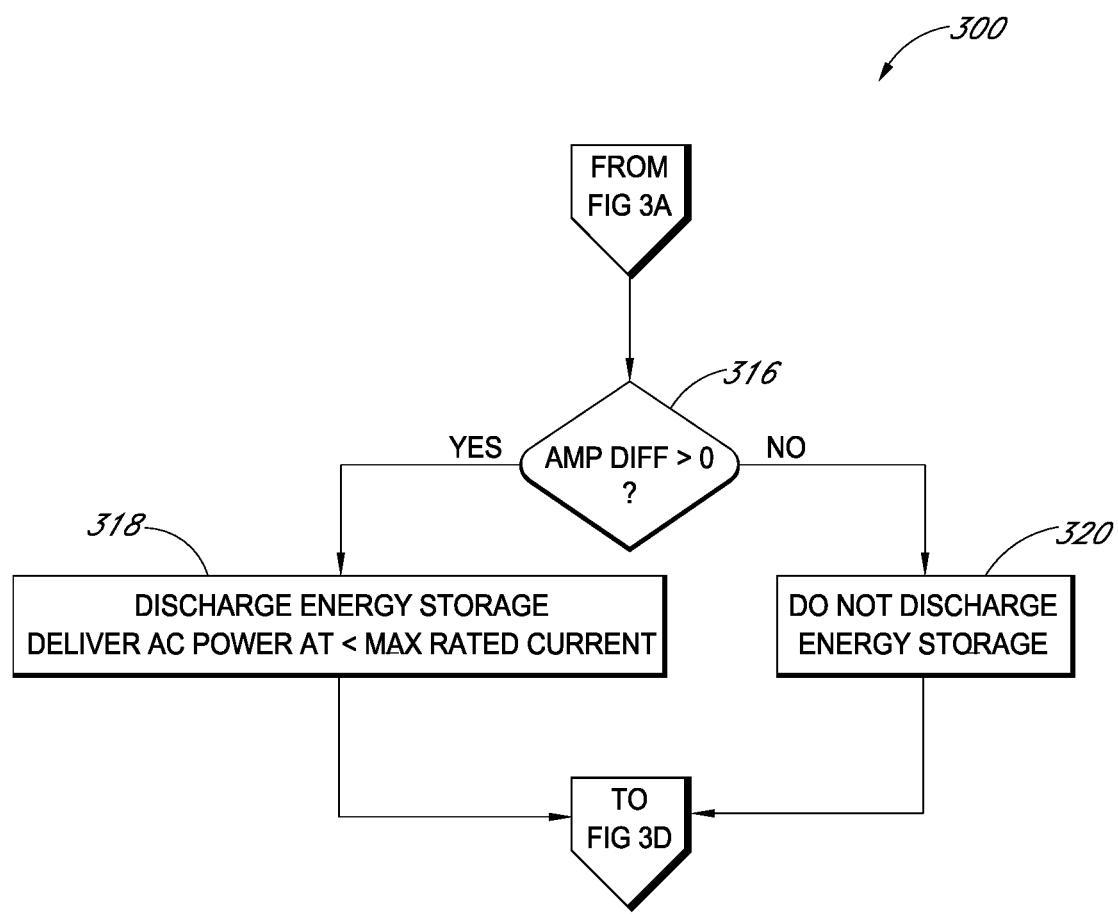

Referring now to FIG. 3C, a flowchart illustrating the actions performed by a DER 100 in a discharge state is shown. At block 316, the DER 100 determines whether the amperage difference is greater than 0 amps. If the amperage difference is greater than 0 amps, the DER 100 may discharge energy storage 102 and deliver AC power to the AC circuit at amperage less than the maximum rated current of the AC circuit at block 318. As will be understood, if the amperage difference is 0 amps (or less), then the load device 214 is drawing the maximum rated current for the AC circuit (e.g., an AC branch circuit 212). If the DER 100 were to discharge AC power when the load device 214 is drawing the maximum rated current for the AC circuit, then a current higher than the maximum rated current may flow on the circuit between the DER 100 and the load device 214, which may result in damage to the AC circuit, the DER 100, the load device 214, or the facility or the overcurrent protector 120 disconnecting the load device 214 from AC power. If the amperage difference is less than or equal to 0 amps, the DER 100 may not discharge energy from energy storage 102 at block 320. After block 318 or 320, the method 300 may continue on to FIG. 3D discussed herein.

Figure 3D:
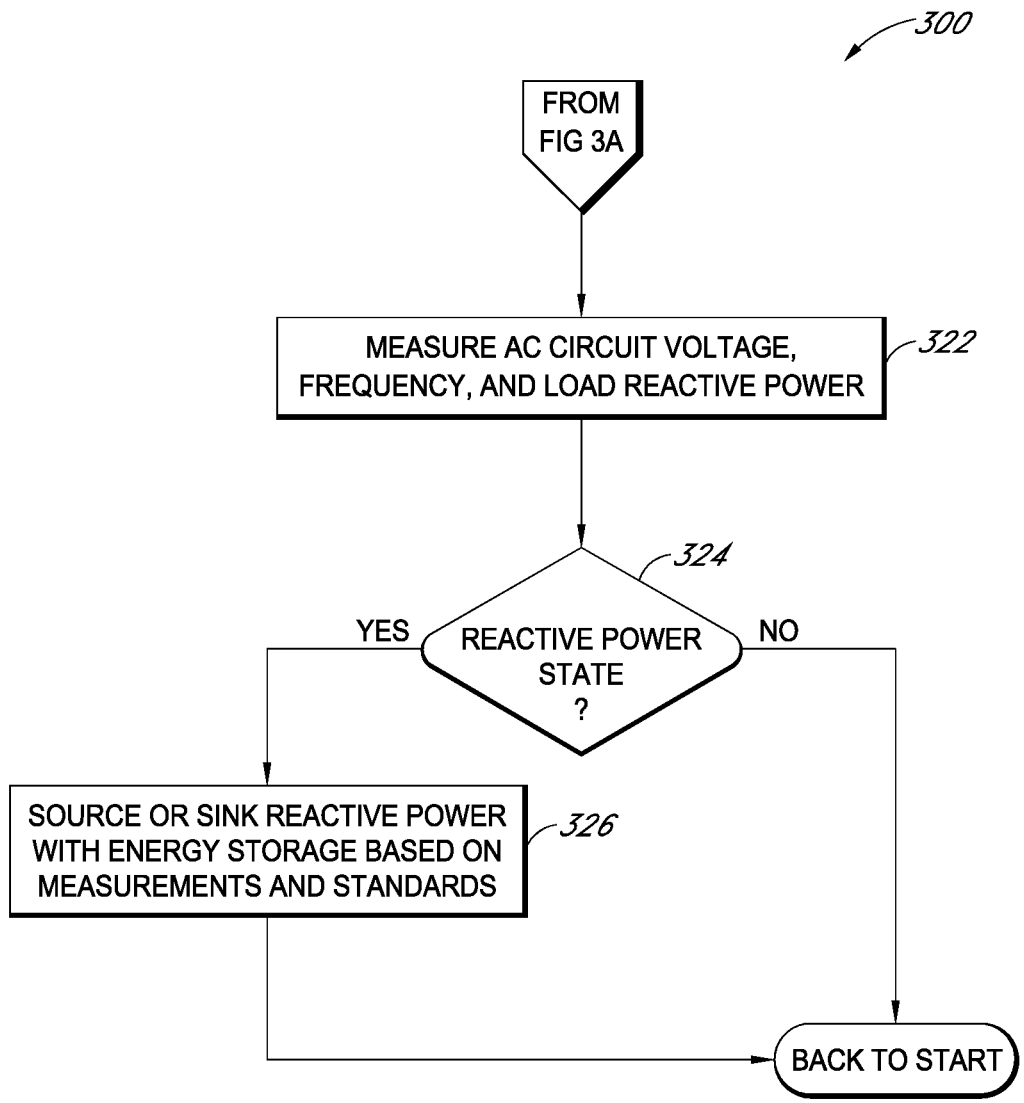

Referring now to FIG. 3D, a flow chart illustrating the action performed by a DER 100 providing grid support functions is shown. At block 322, the DER 100 may measure (e.g., with the voltage sensor 116 and/or load sensor 122) the voltage of the AC circuit, the frequency of the AC circuit, and the reactive power drawn by the load device 214 (collectively "reactive power measurements"). At block 324, the DER 100 determines whether to enter a reactive power state. As discussed above, the local utility may use one or more DERs 100 to provide voltage support and other functions to improve the quality of the AC grid based on one or more standards and the reactive power measurements. For example, a DER 100 may be used to provide reactive power in support of e.g., CA Rule 21, Hawaii Electric Rule 14, UL 1741 SA or pending changes to IEEE 1547 requirements. The DER 100 may enter a reactive power state based on a command received from the utility (e.g., from a remote server 218 via the network 216) or the DER 100 may determine itself whether to enter a reactive power state based on the reactive power measurements and one or more standards. Having determined to enter a reactive power state, the DER 100 may use energy storage 102 to source or sink reactive power based on the reactive power measurements and one or more standards at block 326. It will be understood that the DER 100 may only source or sink reactive power if doing so does not result in drawing more current from the AC circuit than the max rated current of the AC circuit. After providing reactive power (or not) the method 300 may loop back to the start and repeat on FIG. 3A. Reactive power operation may occur independent of the real power control mode of charging state, discharging state or idle state.

Figure 4:
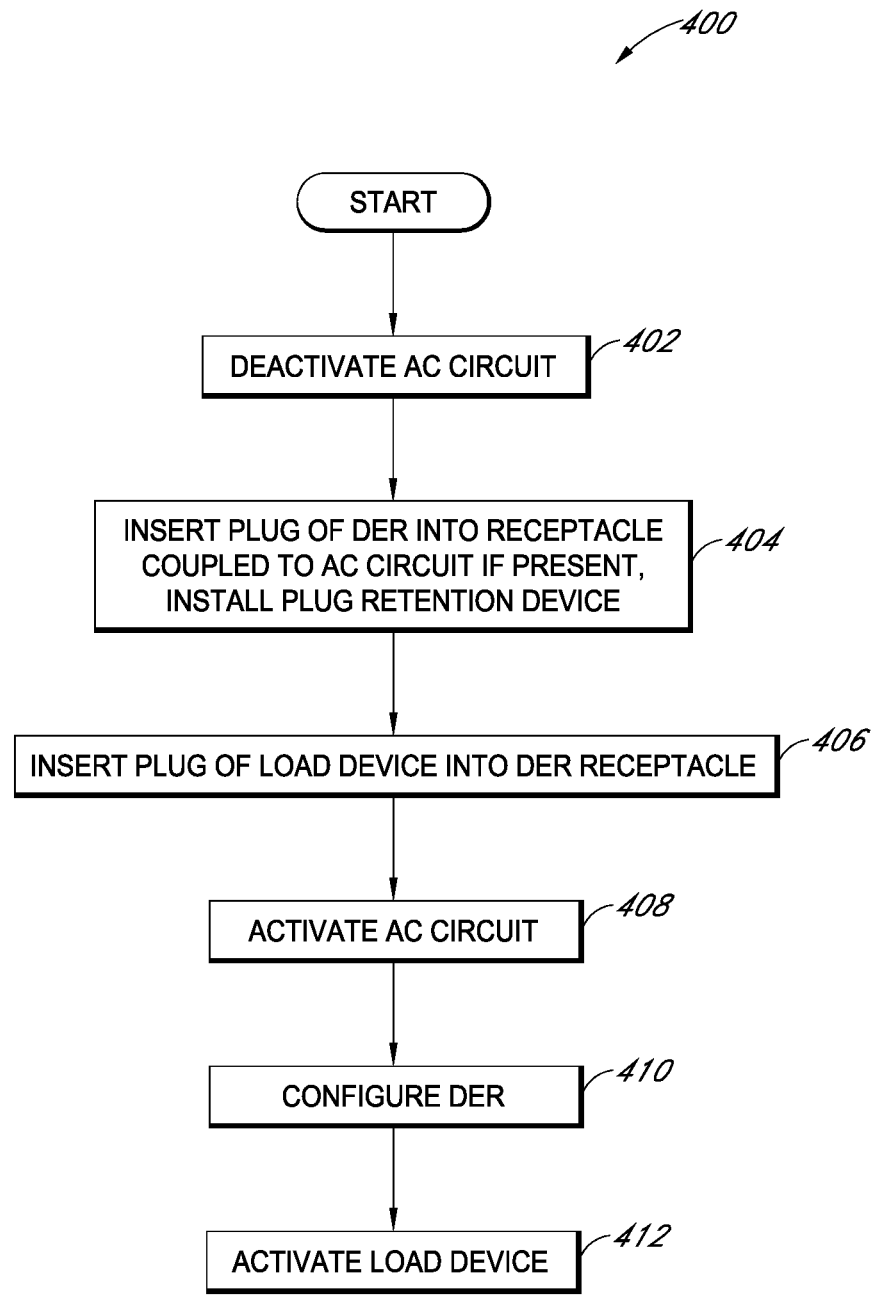
FIG. 4 is a flow chart illustrating an example DER installation method in accordance with various disclosed embodiments.

Referring now to FIG. 4, a flowchart illustrating a DER installation method 400 is shown. The method 400 may be performed to safely add a DER 100 to an AC circuit (e.g., an AC branch circuit 212 of a facility). At block 402, the installer may deactivate the AC circuit. At block 404, the installer may insert the plug 112 of the DER 100 into the receptacle coupled to the AC circuit. If the DER 100 includes a plug retention device 110, the plug retention device 110 may be installed to secure the plug 112. At block 404, the installer may insert the plug of the load device 214 into the load receptacle 124. At block 408, the installer may activate the AC circuit, providing AC power to the DER 100. At block 410, the installer (or another user) may configure the DER 100 (e.g., inputting the maximum rated current of the AC circuit, setting up communication with the network 216, etc.). At block 412, the installer (or other user) may activate the load device 214 (e.g., by turning on an electric dryer).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein.

Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A computer server system comprising:
   one or more computing devices located apart from a distributed energy resource system (DER);
   the one or more computing devices configured to communicate to and from the DER system over a network; and
   the one or more computing devices configured to send a command to the DER system to place the DER system in one or more of a charge state, a discharge state, an idle state, or a reactive power state,
   wherein the DER system comprises:
      a rechargeable battery;
      a dc/ac converter configured to receive a DC voltage from the battery and convert the received DC voltage for receipt by an external AC circuit; and
      one or more controllers configured to designate operation state of the battery in at least a charge state, a discharge state, and an idle state, the one or more controllers further configured to designate a mode of operation of the dc/ac converter, the mode of operation including at least a discharge mode where stored electrical energy in the battery is converted to an AC voltage compatible with and for receipt by the external AC circuit.

2. The computer server system of claim 1 wherein the one or more controllers of the DER system are further configured to designate the discharge mode of operation of the dc/ac converter during a first electrical load period of time of the external AC circuit and to not designate the discharge mode of operation during a second electrical load period of time of the external AC circuit, wherein a first electrical load during the first electrical load period of time is greater than the second electrical load during the second electrical load period of time.

3. The computer server system of claim 1 wherein the one or more computing devices are further configured to receive a command for the DER system from an outside computing device to place the DER system in one or more of a charge state, a discharge state, an idle state, or a reactive power state.

4. The computer server system of claim 1 wherein the outside computing device comprises a laptop, a tablet computer, a smartphone, or a wearable computer.

5. The computer server system of claim 1 wherein the outside computing device comprises a laptop, a tablet computer, or a smartphone.

6. The computer server system of claim 1 wherein the one or more computing devices are further configured to operate a graphical user interface (GUI) to receive information from and send information to the DER system.

7. The computer server system of claim 1 wherein the one or more computing devices are further configured to operate an application program interface (API) to receive information from and send information to the DER system.

8. The computer server system of claim 1 wherein the one or more computing devices are further configured to receive a command for the DER system from a remote utility technician, the received command instructing to place the DER system in one or more of a charge state, a discharge state, an idle state, or a reactive power state.

9. The computer server system of claim 1 wherein the one or more computing devices is one computing server device.

10. A method of commanding a DER comprising:
at a computing device, sending a command over a network from the computing device to place one or more distributed energy resources (DER) in a state comprising a charge state, a discharge state, an idle state, or a reactive power state,
wherein the DER comprises:
a rechargeable battery;
a dc/ac converter configured to receive a DC voltage from the battery and convert the received DC voltage for receipt by an external AC circuit; and
one or more controllers configured to designate operation state of the battery in at least a charge state, a discharge state, and an idle state, the one or more controllers further configured to designate a mode of operation of the dc/ac converter, the mode of operation including at least a discharge mode where stored electrical energy in the battery is converted to an AC voltage compatible with and for receipt by the external AC circuit.

11. The method of claim 10 wherein the computing device comprises one or more of a laptop, a tablet computer, a smartphone, or a wearable computer.

12. The method of claim 10 wherein the network is a computing network including a computer server.

13. The method of claim 10 wherein the computing device is configured to wirelessly communicate with a DER via a WiFi network.

14. The method of claim 10 wherein the command is sent to a computer server.

15. A control system comprising:
a computer server located apart from one or more distributed energy resources (DERs);
the computing server configured to communicate to and from the one or more DERs over a network; and
the computing server configured to send a command to the one or more DERs to place the one or more DERs in one or more of a charge state, a discharge state, an idle state, or a reactive power state,
wherein each DER comprises:
a rechargeable battery;
a dc/ac converter configured to receive a DC voltage from the battery and convert the received DC voltage for receipt by an external AC circuit; and
one or more controllers configured to designate operation state of the battery in at least a charge state, a discharge state, and an idle state, the one or more controllers further configured to designate a mode of operation of the dc/ac converter, the mode of operation including at least a discharge mode where stored electrical energy in the battery is converted to an AC voltage compatible with and for receipt by the external AC circuit.

16. The control system of claim 15 wherein the one or more controllers of each DER are further configured to designate the discharge mode of operation of the converter during a first electrical load period of time of the external AC circuit and to not designate the discharge mode of operation during a second electrical load period of time of the external AC circuit, wherein a first electrical load during the first electrical load period of time is greater than the second electrical load during the second electrical load period of time.

17. The control system of claim 15 wherein the computing server is further configured to receive a command for the one or more DERs from an outside computing device to place the one or more DERs in one or more of a charge state, a discharge state, an idle state, or a reactive power state.

18. The control system of claim 15 wherein the outside computing device comprises a laptop, a tablet computer, a smartphone, or a wearable computer.

19. The control system of claim 15 wherein the outside computing device comprises a laptop, a tablet computer, or a smartphone.

20. The control system of claim 15 wherein the computing server is further configured to operate graphical user interface (GUI) to receive information from and send information to the one or more DERs.

* * * * *